Figures 1, 2:
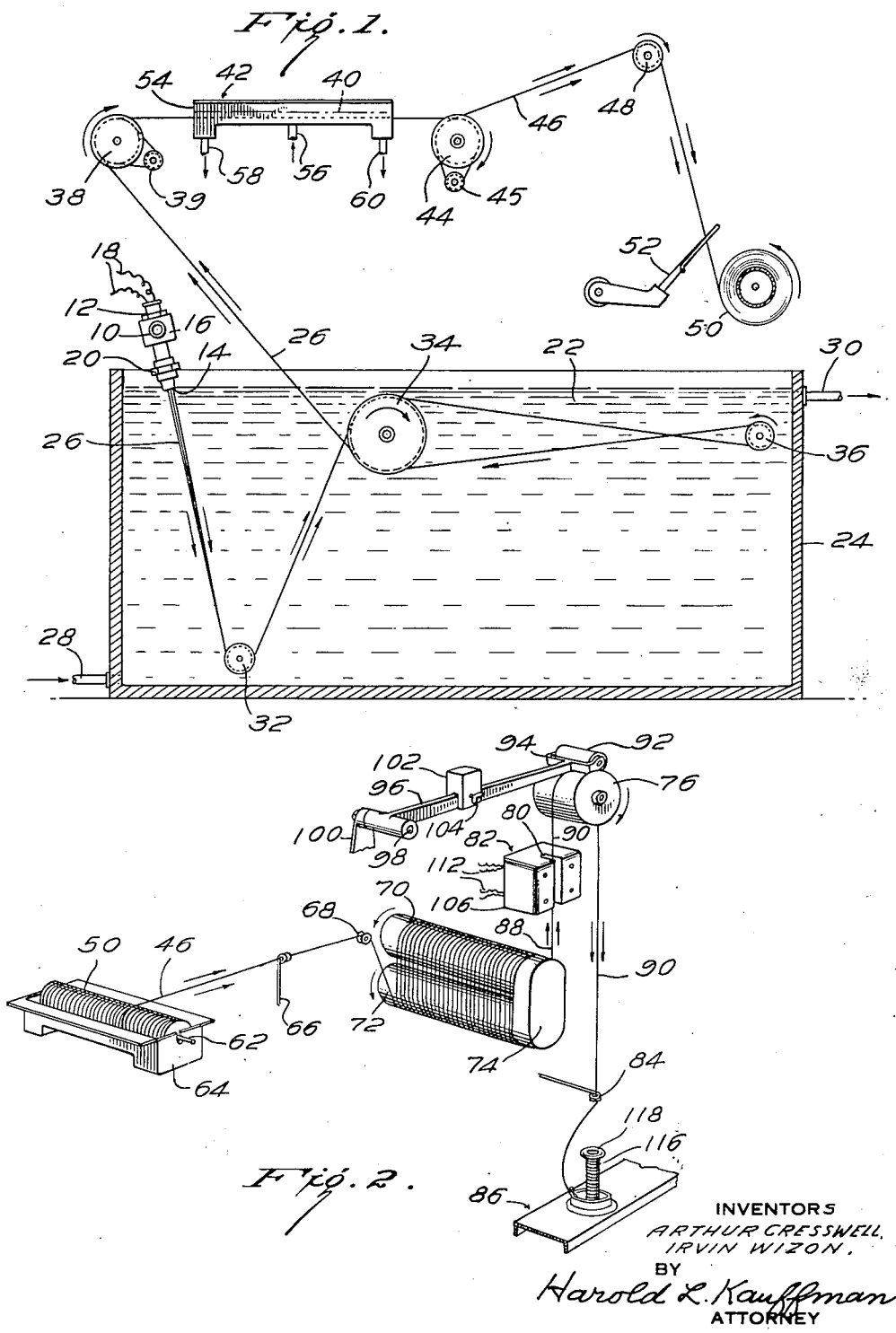

Oct. 21, 1952 — A. CRESSWELL ET AL — 2,614,289
FIBER-FORMING APPARATUS
Original Filed June 8, 1949 — 2 SHEETS—SHEET 1

INVENTORS
ARTHUR CRESSWELL,
IRVIN WIZON.
BY Harold L. Kauffman
ATTORNEY

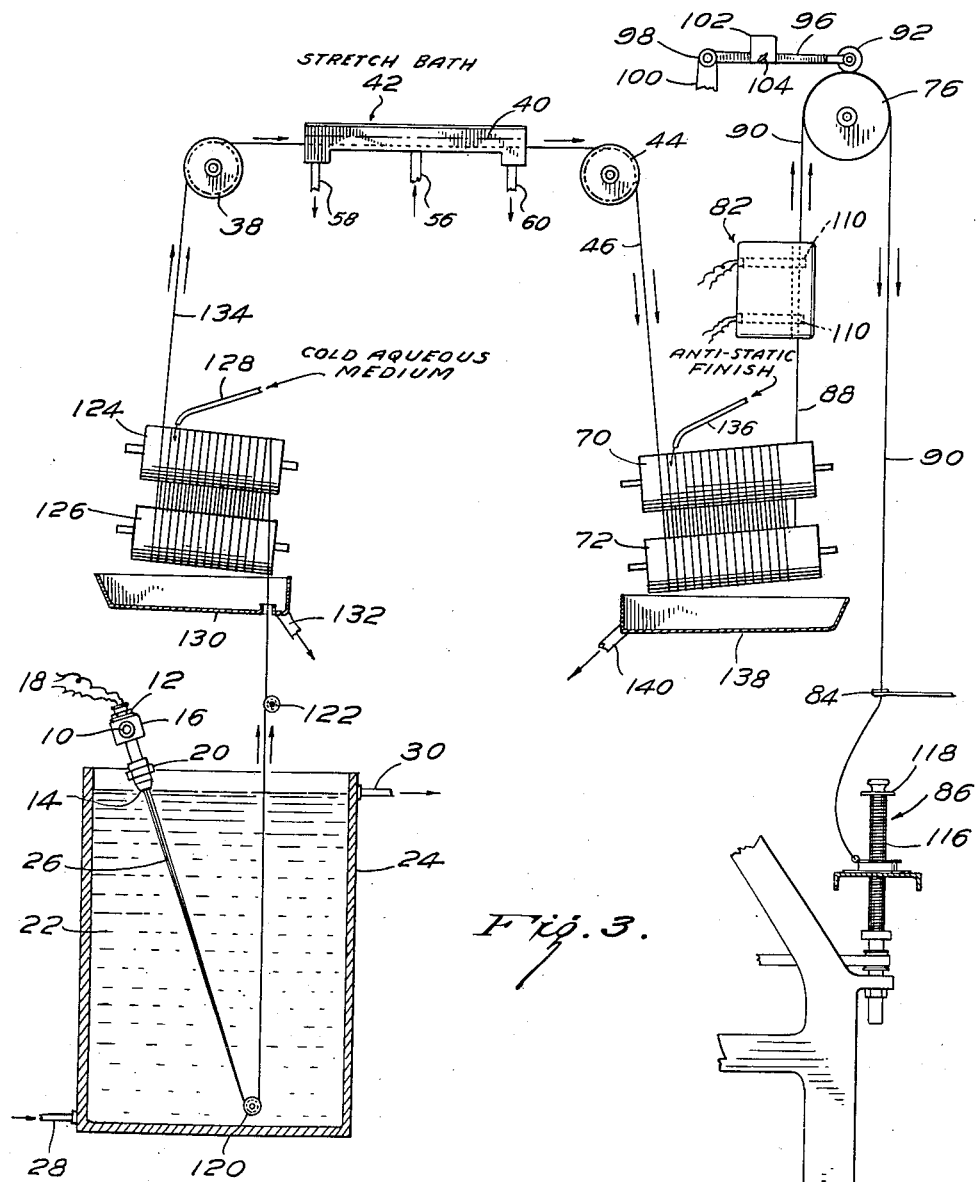

Patented Oct. 21, 1952

2,614,289

UNITED STATES PATENT OFFICE 2,614,289

FIBER-FORMING APPARATUS

Arthur Cresswell, Stamford, and Irvin Wizon, Springdale, Conn., assignors to American Cyanamid Company, New York, N. Y., a corporation of Maine Original application June 8, 1949, Serial No. 97,786. Divided and this application February 27, 1951, Serial No. 212,929

5 Claims. (Cl. 18—8)

This application is a division of our copending application Serial No. 97,786, filed June 8, 1949, now Patent No. 2,558,733 dated July 3, 1951, which application is directed to a method of producing synthetic fibers (including both monofilaments and multifilaments) from polymers and copolymers of acrylontrile.

The invention claimed in this divisional application is concerned with apparatus suitable for use in manufacturing synthetic, flexible, elongated articles, e. g., synthetic fibers.

The invention disclosed and claimed in the copending application of one of us (Arthur Cresswell), Serial No. 772,200 filed September 4, 1947, now Patent No. 2,558,730 dated July 3, 1951, is based on the discovery that useful films, filaments, threads and other shaped articles, which are capable of being dyed, can be produced from acrylonitrile polymerization products of the kind described therein and in Patents 2,117,210, 2,140,921, and 2,404,713–728, as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in the aforementioned Cresswell copending application Serial No. 772,200 is based on the further discovery that the shaped, precipitated gels, e. g., extruded, water-swollen monofilaments and multifilaments, which may be collectively designated as yarns, or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam can be employed. For optimum results during stretching it is important that moisture or water be present. By thus wet stretching the precipitated product, more particularly to an extent at least twice its original length (that is, at least 100%) and preferably from 3 to 15 or 20 or more times its original length, the molecules are oriented along the fiber axis and a product having increased tensile strength, pronounced fibrillation, toughness, resilience and other improved properties is obtained.

The invention disclosed and originally claimed in Cresswell's copending application Serial No. 68,370, filed December 30, 1948, now abandoned in favor of Cresswell's application Serial No. 73,078, filed January 27, 1949, now Patent No. 2,558,731 dated July 3, 1951, and wherein the claims first made in said application Serial No. 68,370 presently appear, is concerned with certain new and useful improvements in the process of producing yarns or fibers from polymers and copolymers of acrylonitrile as disclosed and claimed in the aforementioned copending application Serial No. 772,200 and more particularly to an improved process whereby the stretched, water-swollen or aquagel fiber of the acrylonitrile polymerization product can be continuously dried, or preferably, both continuously spun, stretched and dried whereby a fiber or thread is obtained more quickly and with a minimum of handling so that the product is more uniform and is less subject to damage during processing than, for example, a package-spun fiber or thread.

The invention disclosed and claimed in Cresswell's copending application Serial No. 73,078 filed January 27, 1949, involves a new and novel improvement, which was disclosed but not claimed in the aforementioned copending application Serial No. 68,370 and which consists in the step of stretching the gelled fiber of acrylonitrile polymerization product in the presence of moisture at a temperature within the range of about 70° C. to about 100° C. and, also, while it is in a line which is tangent to two rotating circular surfaces and between which there is no other point of solid, frictional contact, the peripheral speed of one of the said rotating surfaces being greater than that of the other thereby to maintain the gelled fiber under tension. This step can be used in processes carried out with apparatus of the present invention.

Another novel feature of the invention disclosed in Cresswell's aforementioned copending application Serial No. 73,078 involves the step of applying to the gelled fiber (that is, after coagulation of the solution containing the polymeric or copolymeric acrylonitrile in a bath of a cold liquid coagulant comprising water) a cold liquid treating agent comprising water while the said gelled fiber is moving in a helical path. This step also can be used in processes carried out with apparatus of the present invention. The liquid treating agent likewise should be at a temperature not exceeding +10° C., for example at a temperature within the range of −15° C. to +10° C., and preferably at a temperature of about 0° C. to about +5° C. This cold liquid treating agent, which is preferably composed of water at a low temperature such as has been mentioned before, is advantageously applied to the gelled fiber while the fiber is moving in a helical path in contact with a smooth rotating surface which likewise is at a temperature not exceeding +10° C. The rotating surface may take the form of a pair of cylindrical rolls upon which helices of the gelled fiber advance from the feed-on end to the take-off end. These rolls advantageously may be tilted at a suitable angle, for instance, at an angle of about 2° to about 10°, e. g., about 5°, and the liquid treating agent applied at the take-off end of one or both of the rolls whereby the fiber is countercurrently treated or washed with the treating or washing agent. By the application of, for example, cold water to advancing helices of the gelled fiber, any traces of water-soluble impurities which may be present in the fiber or on its exterior surfaces, such, for example, as traces of salts, solutions of which may have been used in dissolving the acrylonitrile polymerization product, will be removed from the gelled fiber prior to the stretching operation. The removal of traces of such water-soluble impurities is advantageous in that it permits optimum stretching of the gelled fiber with resulting improvement in the properties of the final product.

The final step of the process disclosed in Cresswell's application Serial No. 73,078 comprises drying the stretched fiber. This can be done by conventional methods such as by drying at room temperature on a bobbin or other device on which the gelled fiber may have been collected; or drying can be effected continuously by the use of heated, convergent rolls.

The present invention is concerned with certain new and useful improvements in apparatus which is especially adapted for use in carrying out a process of producing yarns or fibers from acrylonitrile polymerization products, specifically such products containing in the molecules thereof an average of at least about 85% by weight of combined acrylonitrile, and more particularly in carrying out a method of producing therefrom synthetic fibers having increased elongation, increased resistance to shrinkage (usually from zero to not more than about 2 or 3% linear shrinkage after immersion for 10 minutes in boiling water), as well as other improvements in properties.

The dried, oriented fibers or yarns produced by the methods disclosed and claimed in the aforementioned Cresswell copending applications, viz, Serial Nos. 772,200, 68,370 and 73,078, generally have good wet and dry tenacities (e. g., at least 3 grams per denier, more particularly from 3.5 to 4 or even as high as 4.5 or more grams per denier), but have relatively high shrinkage when immersed in very hot or boiling water or in a high temperature or boiling aqueous dye bath. Furthermore, their elongation (that is, the per cent to which they can be extended under stress before breaking) is usually of the order of 7 to 13%, which is inadequate elongation (especially at the lower percentage values) for many applications of the fiber. For instance, in textile operations such as twisting, weaving, knitting, etc., it is generally desirable that the fiber or yarn may have an elongation of from 15–18% to 22–25%.

Our invention, as herein claimed in this divisional application, provides apparatus which is a solution to the problem of economically and rapidly improving the elongation and resistance to shrinkage of synthetic fibers produced from acrylonitrile polymerization products by the methods disclosed in the aforementioned Cresswell copending applications. Such fibers, made by means of apparatus of the present invention, are either completely non-shrinking or have a low order of shrinkage when immersed in boiling water for 10 minutes; in addition, they have improved, specifically increased, elongation characteristics which render them eminently suitable for use in weaving, knitting and other textile operations. Because of their zero or low percentage of shrinkage, very hot or boiling aqueous dye baths can be used effectively in dyeing the fiber or fabrics made therefrom; that is, the fibers or fabrics can be dyed at the high temperatures commonly used in dyeing other textiles without shrinking or otherwise adversely affecting the properties of the products. Furthermore, fabrics made from our fibers having from 0 to 1 or 2% shrinkage can be laundered satisfactorily without any particular limitation upon the temperature of the wash water. Another advantage of our invention resides in the fact that the aforementioned improvements in properties are obtained without excessively or materially decreasing, if at all, the dry and/or wet tenacity values of the dried, oriented fiber.

We have found that gelled, stretched, continuously dried fibers produced from a soluble acrylonitrile polymerization product containing in the molecules thereof an average of at least about 85% by weight of combined acrylonitrile (as disclosed in the aforementioned copending Cresswell applications) are, surprisingly, amenable to a rapid, continuous heat treatment whereby the properties of the fiber or yarn are materially improved. More particularly we have found that the aforementioned improvements in properties can be obtained rapidly and inexpensively by continuously passing the dried fiber (immediately after it has been continuously dried and, more particularly, while moving under tension in a helical path) through a heated zone, e. g., a zone of hot air, hot flue gases, hot nitrogen, or other medium, specifically a gaseous medium, in which the fiber is inert, under certain particular conditions of time and temperature and while the fiber is relaxed and free to contact linearly. The zone through which the relaxed fiber is continuously passed should be maintained at a temperature within the range of 100° C. (about 100° C.) to 500° C. (about 500° C.), preferably within the range of about 175° C. to about 400° C. The relaxed, free-to-shrink (free-to-contract) fiber should be passed through the aforementioned heated zone at a rate such that the time at which any given point on the said fiber is within the said zone is from 0.01 (about 0.01) to 5 (about 5) seconds, preferably from 0.01 to 1 second. The temperature of the hot zone and the rate at which the dried, relaxed fiber is passed therethrough are such that no substantial decomposition of the fiber occurs.

The apparatus of the present invention is useful in carrying out a method of producing a synthetic fiber, more particularly a synthetic fiber having improved physical properties, from a soluble acrylonitrile polymerization product containing in the molecules thereof an average of at least about 85% by weight of combined acrylonitrile, which method comprises first extruding the said product in the form of a fiber from a water-coagulable solution thereof, more particularly from a solution of the acrylonitrile polymerization product in a concentrated aqueous solution of a water-soluble salt, specifically a water-soluble metallic salt, which yields highly hydrated ions in aqueous solution, e. g., calcium thiocyanate or other water-soluble thiocyanate. Immediately after extrusion the extruded mass is contacted with a liquid coagulant comprising water, which coagulant is at a temperature not exceeding +10° C., thereby to precipitate the said product from the said solution as a stretchable, gelled fiber. After stretching the gelled fiber in the presence of moisture and at a temperature within the range of about 70° C. to about 110° C., a liquid composition containing an anti-static agent is applied to the stretched or oriented gelled fiber. The resulting gelled fiber is then continuously dried while it is moving under tension in a helical path and thereafter is continuously heated, while relaxed and free to contract linearly, under time and temperature conditions such as have been mentioned hereinbefore.

Surprisingly, we have found that fibers of an acrylonitrile polymerization product which have been spun, stretched and dried as described in the aforementioned Cresswell copending applications can be heat treated, while relaxed and free to contract linearly, for an extremely brief period of time, more particularly for a period of the order of 0.01–0.1 to 1–5 seconds, at 100°–500° C. and thereby obtain shrink-resistant fibers having increased percentage elongation, e. g., from 1.2 to 2.5 times (or more) that of the same dried, oriented fiber prior to the after-heat treatment. This was quite unobvious and unpredictable since ordinarily it would be expected that dried, oriented fibers having essentially the same chemical composition would require the same conditions of heat treatment in order to obtain corresponding improvements in properties. The reason why we are able to obtain the marked improvement in properties by such a brief or shock heat treatment is not clearly understood, but probably it is due to the differences in the physical structure of the dried, oriented fibers of acrylonitrile polymerization product which are subjected to heat treatment in a relaxed state, that is to say, between the dried, oriented fibers resulting from the methods disclosed and claimed in the aforementioned Cresswell copending applications and those produced by other methods known to the art.

The novel features which are characteristic of our invention are set forth in the appended claims. The invention itself, however, will best be understood by reference to the following more detailed description when considered in connection with the accompanying drawing in which Fig. 1 is a diagrammatic side view of one portion and Fig. 2 is a diagrammatic view, shown in perspective, of another portion of apparatus that can be used in producing, for instance, polyacrylonitrile fibers of the kind hereinbefore mentioned, and illustrative thereof; Fig. 3 is a diagrammatic side view of another and preferred form of apparatus embodying our invention; and Fig. 4 is a transverse, elevational view of a portion of the apparatus shown in Figs. 2 and 3. Both Figs. 1 and 2 show portions of apparatus that are embodied in the apparatus which is claimed in this divisional application.

Polymeric acrylonitrile and acrylonitrile copolymers containing in the molecules thereof an average of at least about 85% by weight of combined acrylonitrile can be used in producing fibers by means of apparatus of the present invention. These acrylonitrile polymerization products are prepared by methods well known to those skilled in the art. In some cases the polymerization rates of the individual monomers in a polymerizable mixture may be different, with the result that the proportions of the components in the final copolymer are different from the proportions thereof in the mixture of monomers which is polymerized. In the copolymeric products which are used in making fibers by means of apparatus of the present invention, the proportions of monomers in the polymerizable mixture from which the copolymers are made preferably are adjusted so that the final copolymer contains in the molecules thereof an average of at least about 85% by weight of combined acrylonitrile. The expression, "polymerization product containing in the molecules thereof an average of at least about 85% by weight of combined acrylonitrile" as used herein, means a polymerization product (polymer, copolymer or interpolymer or mixture thereof) containing in its molecules an average of at least about 85% by weight of the acrylonitrile unit, which is considered to be present in the individual polymer molecule as the group

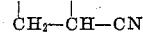

or, otherwise stated, at least about 85% by weight of the reactant substance converted into and forming the polymerization product is acrylonitrile (combined acrylonitrile).

Illustrative examples of monomers which can be copolymerized or interpolymerized with acrylonitrile to yield a polymerization product (copolymer or interpolymer) containing in the polymer molecules an average of at least about 85% by weight of acrylonitrile are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides and fluorides; allyl-type alcohols, e. g., allyl alcohol, methallyl alcohol and other unsaturated monohydric alcohols; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylate, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta- unsaturated polycarboxylic acids also can be copolymerized with acrylonitrile to form copolymers which can be used in practicing the present invention. Examples of such esters are the dimethyl, -ethyl, -propyl, -butyl, etc., esters of maleic fumaric, citraconic, etc., acids.

The proportions of monomers in the polymerizable mixture may be varied as desired or as may be required in order to obtain a polymerization product containing in the polymer molecules an average of at least about 85% by weight of acrylonitrile. Thus, when the polymerization rate of the monomers present in the polymerizable mixture is substantially the same, the proportions can be, for example, from, by weight, about 85% to about 99% of acrylonitrile to from about 15% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least about 85% by weight of combined acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Strain Patent No. 2,135,443 and Bauer et al. Patent No. 2,160,054. The polymeric and copolymeric acrylonitriles which are used in practicing the present invention may be of any suitable molecular weight, but ordinarily the molecular weight (average molecular weight) is within the range of 15,000 to 300,000 (more particularly from 35,000 to 300,000) or higher, and advantageously is within the range of about 50,000 to about 150,000, as calculated from viscosity measurements using the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with a liquid coagulant comprising water, more particularly water which is at a temperature not exceeding substantially +10° C., preferably at or below +5° C., e. g., at from —10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile polymerization product, more particularly such a product containing in the molecules thereof an average of at least about 85% by weight of combined acrylonitrile, in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in Cresswell's copending application Serial No. 772,201 filed September 4, 1947, now Patent No. 2,533,224 dated December 12, 1950.

With reference to the accompanying drawing and more particularly to Fig. 1 thereof, a water-coagulable solution of the polymeric or copolymeric acrylonitrile, which has been filtered (if necessary) and de-aerated, is passed under pressure from a supply reservoir (not shown) through the conduit 10 into a spinneret coupling or heading 12, which preferably is designed so that the solution can be heated, e. g., by electrical, hot water, steam or other means, prior to extrusion through the spinneret 14. A suitable design of a spinneret coupling, which is heated by electrical means, is shown in Fig. 2 of the drawing accompanying Cresswell's aforementioned copending application Serial No. 772,200. The device there illustrated, and portions of which will be described herein with reference to Fig. 1 of the present drawing, comprises a male coupling 16 in which is annularly spaced an electrically heated cartridge provided with lead-in wires 18. This cartridge advantageously may be fitted in the male coupling 16 by means of a liquid-tight plug. The electrically heated cartridge is so positioned as to project beyond the lower end of the male coupling 16 and into the cup of the spinneret 14, which is attached by means of female coupling 20. The solution being charged through conduit 10 passes annularly between the outer wall of the cartridge and the inner wall of the male coupling 16 and thence into the spinneret 14. Since the electrically heated cartridge projects into the cup of the spinneret, the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinneret at a greater speed, thereby increasing the amount of fiber or yarn that can be produced from a particular unit.

The spinneret coupling 12 may be held by suitable means (not shown) above the cold aqueous coagulating or precipitating bath 22 in vessel 24 at any convenient angle. For example, the spinneret coupling may be positioned at less than a 90° angle to the surface of the aqueous coagulating bath 22 as shown in Fig. 1 of the drawing accompanying the present application or at approximately a 90° angle to the surface of the said bath as shown in Fig. 1 of the drawing of Cresswell's aforementioned copending application Serial No. 772,200. The coupling preferably is positioned so that only the face of the spinneret contacts the coagulating bath.

As the solution is forced under pressure through the openings in the spinneret, it coagulates or precipitates in the form of solid, water-swollen or gelled filaments or fiber 26 upon entering the coagulating bath 22, which is maintained at a temperature not exceeding substantially +10° C. by any suitable means. For example, water may be refrigerated or cooled to the desired low temperature and circulated through the vessel 24, being introduced through the conduit 28 and withdrawn through the conduit 30. Alternatively, and as shown in Fig. 1 of the drawing accompanying Cresswells' aforementioned copending application Serial No. 722,200, cooling coils through which is circulated a liquid coolant, e. g., a refrigerated brine solution, may be employed to maintain the bath 22 at the desired low temperature. It will be understood, of course, that various other means may be used to keep the bath 22 at or below +10° C. For instance, instead of employing means such as mentioned above, we may add ice alone to the bath, or a mixture of ice and sodium chloride or other salt, or ice and methyl or ethyl alcohol, or other suitable temperature depressants or mixtures thereof in order to reduce the bath of liquid coagulant comprising mainly water to the desired low temperature.

The coagulated fiber in gel state is led through the bath 22, which preferably is of the circulating type, by any suitable means.

The gelled fiber may be led through the bath 22 merely with the aid of a guide roll or sheave 32 to facilitate the passage of the fiber through the coagulating bath, as is shown in Fig. 1 of the drawing accompanying Cresswell's aforementioned copending application Serial No. 772,200. Advantageously, however, the gelled fiber is led through the bath 22 with the aid of a submerged, power-driven godet 34 and multigroove roll 36. For instance, the gelled fiber may be led through the bath 22 and out of it, as is shown in Fig. 1 with the aid of guide roll 32, power-driven godet 34 and multi-groove roll 36. The gelled fiber is wrapped several times between the godet 34 and the multi-groove roll 36. This arrangement permits a long bath travel by multiple winds of synthetic fiber, without causing excessive tension on the fiber, such as may occur when a pair of multi-groove rollers alone is used in leading the fiber through the bath.

It is important that the coagulating bath 22 be at a temperature not exceeding substantially +10° C., and preferably at or below +5° C., e. g., —10° C. to 0° C., or +1° or +2° C. Temperatures below —15° C., e. g., —20° C. or lower, may be employed if desired, but such temperatures are more costly to secure and maintain, and no particular advantages appear to accrue therefrom. By the use of a low-temperature, aqueous coagulating bath as herein described, the shaped, coagulated or precipitated material, more particularly an extruded, water-swollen or gelled fiber or thread, is clear (transparent) of substantially clear, cohesive, has considerable elasticity and toughness, and is capable of being oriented, e. g., by stretching. In marked contrast, when the aqueous coagulating bath is substantially above +10° C., e. g., +20° C. or +25° C. or higher, the resulting fiber or thread usually either is opaque or shows considerable haze, is spongy and has little or no mechanical strength. Furthermore, it is either unstretchable or has a low order of stretchability, yielding on drying a brittle fiber or thread which cannot be used for textile purposes.

Furthermore, when multifilaments are produced with the aid of a low-temperature coagulating bath as herein described, the individual water-swollen or gelled filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings.

In producing fibers by means of apparatus of the present invention, the spun fibers are treated after leaving the coagulating bath in order to orient the molecules and thereby to increase the tensile strength and otherwise to improve the properties of the spun material. Orientation is preferably effected by stretching the fiber, while still in its water-swollen or gel state, in the presence of moisture and at a temperature within the range of about 70° C. to about 110° C., more particularly at a temperature of about 90° C. to about 100° C. This stretching may be effected, for example, in the manner illustrated in Fig. 1 of Creswell's aforementioned copending application Serial No. 772,200 or, preferably, as illustrated in Figs. 1 and 3 of the drawing accompanying the instant application.

With reference to Fig. 1 of the drawing of the present application, the fiber 26 after leaving the aqueous coagulating bath 22 passes over the revolving wheel or godet 38 and the auxiliary roller 39, being wrapped one or more (e. g., two or three) times about each, into the hot aqueous liquid medium 40, e. g., hot water, contained in the stretch trough 42, and thence over the godet 44 and the auxiliary roller 45, about each of which the fiber also is wrapped one or more (e. g., two or three) times. The peripheral speed of the godet 38 may be slightly greater than that of the godet 34. The godet 44 is caused to revolve at a peripheral speed greater than that of the godet 38; in other words, the surface speed of the godet 44 is such that the ratio of speeds of godets 38 and 44 is proportional to the desired stretch which is to be applied to the fiber as it passes through the hot aqueous liquid medium 40. After leaving the godet 44 the stretched or oriented, gelled fiber 46 passes over the guide roll or sheave 48 and then is collected on a take-up spool or bobbin 50 with the aid of the traverse guide 52. A small amount of water or other liquid medium adapted to maintain the stretched fiber in a gel state may be applied by any suitable means to the fiber as it is being collected on the bobbin 50. For instance, the revolving bobbin may be continuously sprayed with water as the fiber is being collected thereon. Instead of being wound upon a spool or bobbin the stretched fiber may be collected, for example, in a centrifugal pot whereby twist is advantageously applied to the wet fiber.

The amount of stretch that is applied to the water-swollen or gelled fiber may be varied widely, but in all cases should be sufficient to cause at least appreciable orientation of the molecules and an improvement in the properties of the fiber undergoing treatment. The amount of tension to which the fiber is subjected obviously should not be so great as to cause the fiber to break. Depending, for example, upon the type of material being stretched or elongated and the particular properties desired in the finished product, the amount of stretch may vary, for instance, from 100%, preferably from 200 or 300%, up to 2000% or more of the original length of the fiber.

The stretch trough 42 illustrates one suitable form of apparatus which may be used in the stretching operation. More detailed views of this trough are shown in Figs. 5, 6 and 7 of the drawing accompanying Cresswell's aforementioned copending application Serial No. 68,370 and, also, in application Serial No. 146,880, filed February 28, 1950 as a division of said application Serial No. 68,370, the stretch trough there described and illustrated being broadly and specifically claimed in said divisional application which has now matured into Patent No. 2,558,734 dated July 3, 1951. This trough is positioned between the godets 38 and 44 so that the fiber 26, which is tangent to the tops of the godets, is slightly above (e. g., about 1/8 inch above) the bottom of a V-shaped trough portion as it passes through the hot aqueous liquid medium contained in the trough 42. The fiber 26 enters the stretch trough 42 slightly above the bottom portion of the U of a U-shaped slot in end wall 54 of the trough. The hot aqueous liquid medium in which the fiber is stretched is preferably circulated through the trough 42, entering the trough through the conduit 56 and leaving through the conduits 58 and 60. As is shown in Figs. 5, 6 and 7 of Cresswell's application Serial No. 68,370, the V-shaped trough portion is provided with a series of openings in the bottom of the trough and in each of the sides forming the V. The hot aqueous liquid medium 40 entering the stretch trough 42 through the conduit 56 is forced through the aforementioned openings, thereby mildly agitating the hot aqueous liquid in the trough. The liquid medium 40 flows along the V-shaped trough portion into collecting reservoirs located at each end of the stretch trough 42, from which reservoirs it then passes through the conduits 58 and 60 to a supply reservoir (not shown).

The hot aqueous liquid medium 40 which is circulated through the trough 42 may be heated by any suitable means (not shown) to the desired temperature. For example, the water or other aqueous liquid medium employed may be heated electrically, or by gas, steam or other means, in a suitable heating unit having a supply reservoir and connecting conduits to and from the stretch trough 42 for circulation of the hot aqueous liquid medium between the supply reservoir and the stretch trough. To conserve heat and in order better to maintain the temperature of the aqueous liquid in the stretch trough, it is usually desirable to insulate the trough with suitable heat-insulation, e. g., glass fibers, asbestos, cork, etc., in board, sheet, tape or other form in which these materials are available for use as heat insulation. A suitable cover (not shown), which may be hinged or which merely may fit loosely over the top of the trough and is removable therefrom, also advantageously may be provided in order to reduce heat losses and to provide a better control of the temperature of the hot aqueous liquid in the stretch trough. Such a cover likewise is preferably insulated with a suitable insulating material such as one or another of those mentioned above by way of illustration. The cover is raised or removed (if detachable from the trough) when "threading-up" the apparatus, and is closed or put back into place after the thread has been positioned in the stretch trough.

Among the advantages of using a stretch trough of the kind described above may be mentioned the following:

The thread, during the stretching operation, may be subject to mechanical damage, i. e., filament breakage, abrasion, etc., if it comes in frictional contact with such devices as hooks, rollers or sheaves, which conventionally are used to submerge a thread in a bath. The above-described device avoids this defect by having no frictional contact on the thread during this critical operation. Another advantage accrues by reason of the slight lift imparted to the thread by the multitude of small jets of water under the thread, thereby preventing any possible sag and contact of the thread with the bottom of the trough.

With reference to Fig. 2 of the drawing, the stretched, gelled fiber 46 on the bobbin 50 is then treated with a liquid composition, more particularly an aqueous dispersion, containing an anti-static agent by placing the bobbin supported on a trunnion 62 in the vessel 64 containing the anti-static treating or finishing composition. The helices of gelled fiber on the bobbin are treated throughout their length with the liquid anti-static composition as the bobbin rotates while withdrawing the gelled fiber from the bobbin as indicated in Fig. 2. Any suitable anti-static agent may be employed. Examples of anti-static agents which can be used are the guanylurea and guanidine salts of mono-aliphatic hydrocarbon esters of sulfuric acid, more particularly such salts wherein the aliphatic hydrocarbon grouping contains from 12 to 18 carbon atoms, inclusive, e. g., guanylurea octadecyl hydrogen sulfate, guanidine octadecyl hydrogen sulfate, guanidine oleyl hydrogen sulfate, etc. Other examples of such guanylurea and guanidine salts which can be used as anti-static agents are given in Cresswell's copending applications Serial No. 63,361 and Serial No. 68,372 filed December 30, 1948, now Patent No. 2,581,836 dated January 8, 1952 and Patent No. 2,597,708 dated May 20, 1952, respectively. Still other examples of anti-static agents which may be used are $\beta$-alkoxypropionitriles, e. g., octadecoxypropionitrile; reaction products of ethylene oxide and a long-chain alkyl guanamine, e. g., octadecyl guanamine; and reaction products of ethylene oxide and a long-chain alkyl guanidine, e. g., octadecyl guanidine.

It is not essential that the liquid treating composition, e. g., an aqueous dispersion, which is applied to the stretched, gelled fiber 46 contain only an anti-static agent as the sole effect agent which is present in the composition. In some cases, however, it may be desirable or advantageous to use an anti-static agent alone as the sole effect agent, more particularly such agents which are inherently capable of functioning both as a lubricating agent and as an anti-static agent. In other cases it may be desirable to use the anti-static agent in conjunction with other conditioning or effect agents which are commonly employed in treating synthetic fibers, more particularly fibers produced from acrylonitrile polymerization products. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in conjunction with the aforementioned guanylurea salt or guanidine salt or other antistatic agent are wetting and dispersing agents and textile lubricants of various kinds, for instance N-octadecyl disodium sulfosuccinamate, dioctyl sodium sulfosuccinate, lecithin, esters of long-chain fatty acids, e. g., alkyl stearates, palmitates and oleates, more particularly the ethyl, propyl, butyl and amyl stearates, palmitates and oleates.

The liquid finishing composition in the vessel 64 may be at any suitable temperature, e. g., at from about 40° C. to about 70° C.

After being treated with the liquid finishing composition containing the anti-static agent, the treated, stretched fiber in gel state is led continuously with the aid of the thread guide 66, over the guide roll 68 and thence to the take-up or feed-on end of the drying rolls 70, 72. The fiber or yarn is under tension as it is led to these rolls and, also, as it advances in a helical path over the surfaces of the rolls to the delivery or take-off end.

The drying unit shown by way of example in Fig. 2 comprises two positively driven drums or rolls 70 and 72, suitably spaced from each other, e. g., 6 or 8 inches or more, suspended in the same plane, and rotating at the same peripheral speed. The rolls are slightly inclined (i. e., converge) toward each other at the delivery end thereby to advance the thread over the rolls. The degree of convergency may be varied as desired or as conditions may require in order to advance the thread in a plurality of helices over the rolls. Both rolls may converge slightly toward each other at the delivery end with the axis of each inclined to the horizontal or with the axis of one inclined to the horizontal while the other is horizontal. With rolls 4 inches in diameter and 10 inches long, satisfactory results have been obtained by having the upper roll horizontal and the lower roll convergent to the upper roll, at the delivery end, by an angle of about 0.6°. If desired, both rolls may be tilted at a suitable angle to the horizontal, e. g., at an angle of approximately 5° to the horizontal.

Either or both of the rolls 70 and 72 may be heated by any suitable means. For example, the rolls may be heated and the advancing thread dried by blowing a blast of hot air or other hot gas over the surfaces of either or both rolls. Preferably, however, either or both rolls are hollow and are internally heated so as to provide a surface temperature on the exterior of the rolls within the range of about 40° C. to about 200° C., more particularly within the range of about 50° or 60° C. to 100° or 120° C. Thus the hollow rolls or drums may be internally heated electrically, or by steam, hot air or other gas, hot water or by any other suitable means. A simple method of internally heating either or both rolls is by radiation from electrical strip heaters positioned within the rolls, which heaters are mounted by clamping onto a support bar. The electrical connections for the heaters may be attached through the oval-shaped hollow plate 74. Preferably both rolls are internally heated.

From the foregoing description it will be seen that the advancing helices of the treated gelled fiber are dried continuously, and that a portion of each helix is in contact with a heated surface, advantageously a smooth, heated surface so that the possibility of damage to the fiber as it advances over the rolls will be minimized. The temperature of this surface, the portion of each helix which is in contact therewith, the duration of said contact and the number of helices in contact with the heated surface are such that the helices of gelled fiber are dried. Because of the application of the anti-static agent to the gelled fiber prior to its passage over the heated rolls, there is no accumulation of an electrostatic charge on the fibers during their passage over the rolls and, therefore, no difficulty in the continuous drying of these particular fibers of an acrylonitrile polymerization product by the particular method herein described. In the absence of such a pretreatment of the wet, gelled fiber with a composition comprising an anti-static agent, it is extremely difficult, if not impossible, to successfully dry advancing helices of a wet fiber of an acrylonitrile polymerization product due to the charge of static electricity which the fiber accumulates (apparently mainly as a result of friction as the fiber passes over the surface of the roll), thereby causing spreading of the filaments in each helix so that successive helices may overlap and cause damage to the filaments. Furthermore, when the dry thread is delivered from the drying rolls, the "ballooning" of the filaments caused by the accumulated static charge may cause mechanical damage to the thread when passing over the relaxation godet 76.

The rolls 70 and 72 may be made of any suitable material such, for example, as Monel metal, stainless steel, aluminum, chromium-plated copper, chromium-plated steel, anodized aluminum, dense graphite, fused quartz, glass, resin-impregnated glass-fiber laminate, etc. The rolls are preferably made of a material which is a good heat conductor, that is, a material which will permit the rapid transfer of heat from the interior surfaces to the external surfaces of the roll. The rolls may be made of one base material, which then may be plated or otherwise covered with a smooth layer of another material, e. g., a chrome plating.

Instead of applying the anti-static finish as described above, this finish may be applied to the wet gelled fiber in the manner described in Cresswell's aforementioned copending application Serial No. 68,370 with particular reference to Figs. 3 and 4 of the drawing accompanying that application and in the manner there illustrated. Thus, the spun and stretched fiber may be treated with a treating composition comprising an anti-static agent by continuously passing it through a trough through which is circulated an anti-static treating composition, which may be of the kind mentioned hereinbefore. This trough may be of the kind shown in Figs. 1 and 3, but it will be understood, of course, that any suitable vessel or container, which will hold or through which can be circulated the anti-static treating composition and through which the fiber can be continuously passed as hereinbefore described in contact with the said composition, may be employed. The anti-static treating composition which is circulated through such a trough may be at any suitable temperature, e. g., within the range of about 40° C. to about 70° C. Circulation of the anti-static composition through the trough is effected in the same manner as has previously been described with reference to the circulation of water through the stretch bath or trough 42. After being treated with the liquid finishing composition containing the anti-static agent, the treated, stretched fiber in gel state is then continuously dried by passing the fiber over drying rolls such as the rolls 70 and 72.

Alternatively, instead of using separate baths for stretching the fiber and for treating it with a composition comprising an anti-static agent, both operations may be effected by continuously passing the gelled fiber 26 through a combination stretch and anti-static treating bath. During its passage through this bath the gelled fiber is stretched between godets while the fiber is in contact with a liquid medium comprising water and, also, is simultaneously treated with an anti-static agent (numerous examples of which have been given hereinbefore), since such an agent likewise is a component of the liquid medium. The temperature of the liquid medium constituting the combined stretch and anti-static treating bath may be considerably varied, but is usually within the range of about 70° C. to about 100° C. The stretched gel, which has been treated with an anti-static agent conjointly with stretching to orient its molecules along the fiber axis, is then continuously dried under tension, for instance by causing advancing helices of the gelled fiber to pass under tension over drying rolls such as the rolls 70 and 72. Such a method of operation is illustrated in Fig. 4 of the drawing accompanying Cresswell's copending application Serial No. 68,370 and also is readable upon Fig. 3 of the drawing of the present application when the aqueous medium in the stretch trough is a liquid medium comprising water and, also, an anti-static agent. When such a procedure is followed, it is not necessary to apply an anti-static finish to the gelled fiber advancing in a helical path along the drying rolls 70 and 72.

The stretching of the fiber or yarn can be effected with or without an anti-static agent as a component of the stretch bath, but in either case it is preferably effected while the fiber is in a line which is tangent to two rotating circular surfaces and between which there is no other point of solid frictional contact, the peripheral speed of one of the said rotating surfaces being greater than that of the other thereby to maintain the gelled fiber under tension. Other means by which this can be done are shown in Figs. 4, 5 and 6 of the drawing of Cresswell's aforementioned copending application 73,078 and are fully described in the specification of that application with reference to these figures.

Referring again to Fig. 2 of the drawing of the present application, the fiber or thread is continuously led from the delivery end of the drying rolls through a suitable opening, such as the slot 80, in the heat-treating furnace 82 over a relaxation godet 76, thence to a pigtail thread guide 84 and finally to a suitable twister bobbin such, for example, as the ring twister 86.

The godet 76 is caused to revolve at a peripheral speed less than that of the rolls 70 and 72; in other words, the surface speed of godet 76 is such that the ratio of the speeds of godet 76 and of the drying rolls 70, 72 is proportional to the desired relaxation which is to be applied to the dried fiber 88 as it passes through the slot 80 in the furnace 82. The heat-treated fiber 90 is prevented from slipping as it passes over the godet 76 by means of the pinch roll 92 mounted in the roll support 94 located at the forward end of the arm 96, which is pivotally mounted at its other end upon the shaft 98 carried by the support 100. On the arm 96 is slidably mounted a weight 102 which can be held in position at any point on the arm by tightening the screw 104. By adjusting the position of the weight 102 on the arm 96, the pressure or pinch applied to the heat-treated fiber 90 as it passes between the pinch roll 92 and the godet 76 can be varied as desired or as conditions may require.

The heat-treating furnace 82 is constructed so that the temperature of the heating zone formed by the slot 80 will be at a temperature within the range of 100° C. to 500° C. at least in that portion thereof in the path of the running thread as it passes through the slot in a relaxed, free-to-contract state. For example, the furnace 82 can be formed from a solid metallic block 106, such as a block of stainless steel, and which is provided with the slot 80 along one surface thereof. The block is further provided with bores, two of which are shown at 108 in Fig. 4. In these bores are positioned electrical resistance heating units 110 provided with lead-in wires 112. Suitable openings such as the openings 114 provide means for introducing an instrument to facilitate the removal, when necessary, of the heating units 110 from the bores 108. The number and kind of heating units employed and their position in the block 106 are such that the air temperature in the path of the running fiber or thread will be within the aforementioned range, more particularly from about 175° C. to about 400° C., e. g., from 200° or 250° C. to 350° or 375° C. During its passage through the slot 80 the relaxed thread is heated both by radiation and convection to approximately the same temperature as that of the air (or other inert medium that may be present or can be introduced) in the path of travel of the running thread.

It is not essential that the furnace 82 be positioned above the drying rolls 70 and 72 as shown in Fig. 2. For instance, the furnace 82 can be located directly below the drying rolls or at an angle thereto, in which case the position of the relaxation godet also is changed.

We have observed that the fiber or thread passing through the furnace 82 is sufficiently relaxed when the dried thread 88 shows noticeable fluttering before entering the heat-treating furnace. In other words, the thread is sufficiently relaxed when the peripheral speed of the godet 76 is so much lower than the peripheral speed of the rolls 70 and 72 that the dried thread flutters slightly before entering the heat-treating furnace.

From the relaxation godet 76 the heat-treated fiber or thread 90 is continuously led under tension to the pigtail thread guide 84 and finally to a suitable twister bobbin such, for example, as the ring twister 86 whereby the twisted heat-treated fiber 116 is collected on the bobbin 118. Instead of the ring twister shown in each of Figs. 2 and 3, any other suitable type of twister, e. g., a cap twister, or other fiber take-up device adapted to collect the fiber continuously, preferably under tension, can be employed.

If desired, the spinning, stretching, drying and heat-treating operations can be, and preferably are, carried out continuously, for instance as shown by way of illustration in Fig. 3. Corresponding parts have been numbered the same in Fig. 3 as in Figs. 1, 2 and 4.

Referring to Fig. 3, the spinning solution is forced under pressure through the openings in the spinneret 14, whereupon it coagulates or precipitates in the form of solid, water-swollen or gelled filaments or fiber 26 upon entering the coagulating bath 22, which is maintained at a temperature not exceeding substantially +10° C. by any suitable means, this phase of the operation being essentially the same as previously has been described with reference to Fig. 1.

The coagulated fiber in gel state is led through the bath 22, which preferably is of the circulating type, by any suitable means. In the embodiment of the invention shown in Fig. 3, the water-swollen or gelled fiber 26 is led downwardly to a submerged roller 120, which may be positively driven, and thence to the surface. This roller may be conveniently mounted on a removable bracket for ease in changing rollers.

Upon emerging from the coagulating bath 22 the fiber 26 passes over a guide roller 122 and thence to a pair of converging hollow drums or rolls 124 and 126. These rolls are positively driven by a suitable driving mechanism (not shown) and are suitably spaced from each other, e. g., 6 or 8 inches or more. They are suspended in the same vertical plane and are caused to rotate at the same peripheral speed. The rolls are slightly inclined (i e., converge) toward each other at the delivery end, thereby to advance the thread over the rolls. The degree of convergency may be varied as desired or as conditions may require in order to advance the thread in a plurality of helices over the rolls. Both rolls may converge slightly toward each other at the delivery end with the axis of each inclined to the horizontal or with the axis of one inclined to the horizontal while the other is horizontal. With rolls 4 inches in diameter and 10 inches long, satisfactory results ordinarily are obtained by having the upper roll horizontal and the lower roll convergent to the upper roll, at the delivery end, by an angle of about 0.6°. The diameter and length of the rolls may be varied as desired as or conditions may require, but ordinarily they are such that, during operation, the length of thread being washed with cold liquid treating agent comprising water while the said thread is continuously moving in a helical path is from about 5 yards to about 40 yards.

If desired, both rolls may be tilted at a suitable angle to the horizontal, e. g., at an angle of about 2° to 10°, more particularly at an angle of about 5°, to the horizontal. By tilting the rolls at a substantial angle to the horizontal, the thread advancing along the rolls from the feed-on end to the take-off end meets a countercurrent stream of the cold liquid treating agent comprising mainly water, e. g., water itself, at a temperature not higher than +10° C. and preferably at a temperature within the range of about 0° C. to +5° C. This cold liquid treating agent is applied to the advancing helices of thread or fiber from the jet 128.

To prevent the ice water or other cold liquid coagulant comprising water from warming up excessively as it runs along the surfaces of the rolls, a suitable refrigerant advantageously may be introduced into either one or both of the hollow cylinders or rolls 124 and 126, thereby to maintain the exterior surface of the roll in contact with the thread at a temperature not higher than +10° C., more particularly within the range of about −15° C. to about 0° or +5° C. The refrigerant may be, for example, chilled brine, which can be circulated through either one or both rolls through a rotary joint, the brine entering the roll through one conduit and being discharged through another one. The wash water or other liquid treating agent comprising mainly water which is applied to the advancing helices of fiber in this manner drips off the rolls into a collector tray or basin 130 which is positioned immediately below the rolls, and from which the liquid flows into a return line 132 and thence, for example, back to coagulating bath 22 (after being refrigerated if necessary) or to a suitable recovery system.

As has been mentioned hereinbefore, the application of cold water to advancing helices of the gelled fiber facilitates the removal of traces of any water-soluble impurities which may be present in the gelled structure or on the exterior surface of the fiber. For example, when the solvent used in dissolving the acrylonitrile polymerization product is a highly hydrated metallic salt such as calcium thiocyanate, there may be a gradual increase in the concentration of this salt in the liquid coagulating bath 22. At the beginning of a spinning operation there may not be such a high concentration of salt in the spinning bath but as spinning proceeds this concentration increases unless fresh liquid coagulant, e. g., fresh cold water, is added to the bath in order to prevent a substantial increase in concentration of the salt. In cases where the concentration of the salt in the bath has increased materially, there naturally will be a small amount of such salt in or on the fiber as it emerges from the bath. By using treating rolls such as shown in Fig. 3 and applying cold water or other cold liquid treating agent comprising water to advancing helices of the fiber, such traces of salt are removed from the fiber prior to the stretching operation. This is advantageous in that it permits optimum stretching of the gelled fiber with a resulting marked improvement in the properties of the kelled product.

The rolls 124 and 126 may be constructed of the same materials as the drying rolls 70 and 72.

In some cases, however, it may not be necessary or desirable to use treating rolls such as illustrated in Fig. 3. In such instances the gelled fiber may be led through the bath 22 merely with the aid of a guide roll or sheave to facilitate the passage of the fiber through the coagulating bath as is shown in Fig. 1 of the drawing accompanying Cresswell's aforementioned copending application Serial No. 772,200. Or, the gelled fiber may be led through the bath 22 with the aid of a submerged, power-driven godet and multigroove roll as is shown in Fig. 1 of the present application. The latter arrangement permits a long bath travel by multiple winds of synthetic fiber without excessive tension on the fiber, such as may occur when a pair of multi-groove rolls alone is used in leading the fiber through the bath.

With further reference to Fig. 3 the washed, gelled thread or fiber 134 is led from the discharge end of the converging rolls 124, 126 to a godet 38 which has the same surface speed as that of the said converging rolls. The fiber then passes through the hot aqueous liquid medium 40 contained in the stretch trough 42, and thence over the godet 44 about which the fiber is wrapped one or more (e. g., 2 or 3) times. If desired, the peripheral speed of the godet 38 may be slightly greater than that of the converging rolls 124 and 126. The washed, aquagel fiber 134 is stretched in the hot aqueous medium 40 in the same manner as has been described hereinbefore with reference to the stretching of the fiber 26 (Fig. 1).

From the godet 44 the stretched, gelled fiber 46 is led to the drying rolls 70 and 72 on which the fiber is dried, under tension, as it advances in a helical path over the surfaces of the converging, heated rolls from the feed-on end to the delivery or take-off end. These rolls may be constructed, heated and operated in the same manner as has been described hereinbefore with reference to rolls 70 and 72 of Fig. 2. If desired, the rolls 70 and 72 shown in Fig. 3 may be tilted, as there shown, at a suitable angle to the horizontal, e. g., at an angle of from about 2° to about 10°, more particularly about 5°, to the horizontal.

The rolls 70 and 72 (Fig. 3) are caused to rotate at the same peripheral speed, or at a slightly higher speed, than the godet 44 so that the fiber or thread is under tension as it advances along the drying rolls.

At the feed-on end of either or both rolls 70 and 72 (Fig. 3), a finishing composition containing an anti-static agent is applied, as by means of a suitable jet, to the first few helices of fiber advancing along the rolls. In Fig. 3 the anti-static finish is shown by way of illustration as being applied by means of jet 136 upon the upper of the two drying rolls. The jet is preferably so positioned that the anti-static composition is applied directly to the first few helices of the fiber or thread advancing along the rolls. Since the rolls are tilted at an angle to the horizontal, the anti-static finish flows along the upper roll countercurrent to the advancing thread, thereby providing effective contact between the finish and the thread. After contacting the advancing fiber, the liquid anti-static composition drips or flows into the collector tray or basin 138 provided with a suitable conduit or drain 140 for withdrawing the excess finishing composition.

Instead of applying the anti-static finish in the manner illustrated in Fig. 3, this finish can be applied to the wet, gelled fiber in the manner described in Cresswell's aforementioned copending application Serial No. 68,370 with particular reference to Figs. 3 and 4 of the drawing accompanying that application and in the manner there illustrated.

From the delivery end of the drying rolls 70 and 72 the dried fiber or yarn 88 is led, while relaxed and free to contract linearly, through the heat-treating furnace 82, thence over the relaxation godet 76, which is caused to rotate at a peripheral speed less than that of the drying rolls 70 and 72. From the relaxation godet 76 the heat-treated fiber or thread 90 is continuously led under tension to the pigtail thread guide 84 and finally to a suitable twister bobbin such, for example, as the ring twister 86 whereby the twisted, heat-treated fiber 116 is collected on the bobbin 118. The apparatus and methods used in heat-treating the dried thread 88 and in continuously collecting (with or without twisting) the heat-treated thread 90 are the same as have been described more fully hereinbefore with reference to Fig. 2.

It will be understood, of course, by those skilled in the art that, in producing polyacrylonitrile fibers by means of apparatus of the present invention, the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the diameter of the fiber to be spun and the average molecular weight of the polymerization product, which usually is within the range of 15,000 to 300,000, as calculated from viscosity measurements using the Staudinger equation. Good results are obtained when the molecular weight (average molecular weight) is of the order of 35,000–50,000 to 140,000 or 150,000. The concentration of polymer or copolymer may range, for example, from 7 or 8% up to 18 or 20% by weight of the solution. The viscosity of the solution, as determined by measuring the time in seconds for a Monel metal ball $\frac{1}{8}$ inch in diameter to fall through 20 cm. of the solution at 61° C., is generally within the range of, for instance, from 10 to 500 seconds. It has been found that the best spinning solutions from the standpoint of coagulation and optimum properties of the precipitated gel are those which contain the highest concentration of polymer and the lowest concentration of zinc chloride, sodium or calcium thiocyanate, guanidine thiocyanate or other salt of the kinds aforementioned, which concentrations are consistent with solubility and viscosity limitations. A concentration of 7–10% polymeric or copolymeric acrylonitrile in 48–60% sodium or calcium thiocyanate solution has been found to give very satisfactory results. The viscosity of the solution should not be so high that it is difficult to filter or to stir and de-aerate prior to use.

The anti-static agent, to which reference has been made hereinbefore, can be applied to the gelled fiber prior to drying by any suitable means, but preferably it is applied in the form of a liquid dispersion, more particularly an aqueous dispersion. This dispersion may contain any suitable amount of anti-static agent, but ordinarily such an agent is present in the dispersion in an amount corresponding to from about 0.5% to about 5% by weight thereof. The dispersion can be applied, for example, by immersing the fiber in the dispersion, or by spraying or otherwise contacting the fiber with the dispersion. In applying the dispersion, it is preferably heated to an elevated temperature, e. g., from about 45° or 50° C. to about 95° C., or in some cases even as high as 100° C. With some anti-static agents the dispersion containing the same may be applied at room temperature (20°–30° C.) or at temperatures up to 45° C., but such temperatures may be less desirable with other anti-static agents because of the greater difficulty in maintaining the anti-static agent homogeneously dispersed in water or other volatile liquid dispersion medium at the lower temperatures. Upon continuously drying the treated, gelled fiber under tension and subsequently heat-treating the dried fiber in relaxed state as hereinbefore described, the resulting fiber has the anti-static agent deposited at least on the outer surfaces thereof. The amount of anti-static agent which is present in or on the dried and heat-treated fiber may vary considerably, but ordinarily it is present therein or thereon in an amount, by weight, corresponding to from about 0.2% to about 4% of the dried, untreated fiber.

The liquid composition containing the anti-static agent can be applied to the wet, gelled fiber at any suitable stage during its production and prior to continuous drying of the same as hereinbefore described. As previously has been mentioned, it can be applied during the stretching of the wet spun fiber to orient the molecules thereof; or it can be applied between any of the guides or godets or other rolls employed in the spinning process and which precede the continuous drying of the wet fiber. In some cases the gelled fiber may be spun on a bobbin or as a pot cake, dyed, treated with an anti-static agent, and the wet, dyed fiber in gel state thereafter may be continuously dried and then further heat-heated, while relaxed, as previously has been described with particular reference to an undyed, gelled fiber.

If desired, the finishing composition containing the anti-static agent which is deposited in or on the dried and after-heat-treated fiber may be allowed to remain in place during and after the production of the article in its ultimate form, especially in those cases wherein the fiber or fabric or other textile or article made from the same is not later to be dyed. If the fiber (or fabric or other textile or article produced from the fiber) is to be dyed, then the finishing composition containing the anti-static agent is usually removed therefrom prior to dyeing, for example by means of the usual aqueous scouring baths.

The present invention provides apparatus which is useful in carrying out an effective and economical method of improving the physical properties, especially elongation and resistance to shrinkage, of a synthetic fiber produced from an acrylonitrile polymerization product containing in the molecules thereof an average of at least about 85% by weight of combined acrylonitrile. The method is especially suitable for commercial operations, and can be carried out in apparatus which is relatively simple and inexpensive. Surprisingly, too, the shrinkage and elongation characteristics of the fiber are improved without any appreciable (if any) discoloration of the fiber and without adversely affecting other useful properties of the fiber, e. g., moth-resistance, mildew-resistance, resistance to weathering, organic solvents and other chemical agents, etc.

The term "fiber" as used generically herein and in the appended claims is intended to include within its meaning both monofilaments and multifilaments.

We claim:

1. Apparatus suitable for use in manufacturing synthetic, flexible, elongated articles comprising means for producing such an article in gel form; a first rotative means adapted to receive and support the gelled, elongated article and to advance it in a helical path toward the take-off end; means for wet-stretching said gelled, elongated article after it leaves the take-off end of said first rotative means; a second rotative means adapted to receive and support the stretched, elongated article and to advance it, while under tension, in a helical path toward the take-off end; means for drying the stretched, gelled, elongated article while it is moving in a helical path toward the take-off end of said second rotative means; a heat-treating furnace in operative relationship with the take-off end of said second rotative means and separate therefrom; means for moving the dried, elongated article through said heat-treating furnace; and means for relaxing the tension on said dried, elongated article so that the article is free to contract linearly as it passes through said heat-treating furnace.

2. Apparatus adapted for use in the manufacture of synthetic fibers and the like comprising: wet-spinning means including a receptacle adapted to contain a liquid coagulant in operative relationship with a spinneret, whereby in operation a synthetic fiber in gel form is produced; a rotative means adapted to receive and support the gelled fiber and to advance it in a helical path toward the take-off end; means for washing the gelled fiber on said rotative means; a stretch trough, adapted to contain a hot, fluid medium, in operative relationship with the take-off end of said rotative means; means for moving the gelled fiber through said stretch trough and for stretching it during its passage through said trough in contact with said hot, fluid medium; a rotative drying means adapted to receive and support the stretched fiber and to advance it, while under tension, in a helical path toward the take-off end; a heat-treating furnace in operative relationship with the take-off end of said rotative drying means and separate therefrom; means for moving the dried fiber through said heat-treating furnace; and means including a pinch roll for relaxing the tension on said dried fiber so that it is free to contract linearly as it passes through said heat-treating furnace.

3. Apparatus as in claim 2 wherein the rotative means adapted to receive and to support the gelled fiber and the rotative drying means adapted to receive and support the stretched fiber are each comprised of a pair of spaced, cylindrical, converging rolls, each pair of said rolls being suspended in the same vertical plane.

4. Apparatus adapted for use in manufacturing a synthetic fiber continuously comprising: wet-spinning means including a spinneret and a receptacle adapted to contain a liquid coagulant in operative relationship with said spinneret, whereby in operation a synthetic fiber in gel form is produced; a pair of spaced, cylindrical, converging, wash rolls which are suspended in the same vertical plane; means for driving said wash rolls at the same peripheral speed; means for guiding the gelled fiber through said receptacle containing said liquid coagulant and onto the feed-on end of said wash rolls; means for washing the gelled fiber as it advances in a helical path toward the take-off end of said wash rolls; a collector basin suitably positioned for collecting wash liquid flowing off of said wash rolls; means for wet-stretching the gelled fiber after it leaves the take-off end of said wash rolls; a pair of spaced, cylindrical, converging, drying rolls which are suspended in the same vertical plane and which are adapted to receive and support the stretched fiber and to advance it, while under tension, in a helical path toward the take-off end; means for driving said drying rolls at the same peripheral speed; a heat-treating furnace including a slot, adapted to be heated, in operative relationship with the take-off end of said drying rolls and separate therefrom; means for moving the dried fiber through said slot; means including a pinch roll for relaxing the tension on said dried fiber so that it is free to contract linearly during its passage through said slot; and means for collecting the fiber after its passage through said slot.

5. Apparatus adapted for use in manufacturing a synthetic, multifilament thread continuously comprising: a spinneret assembly including a spinneret provided with a plurality of openings in its face and a spinneret heading adapted to receive a source of heat for heating the spinning solution to be extruded through the openings in the face of said spinneret; a receptacle adapted to contain a liquid coagulant in operative relationship with said spinneret, whereby in operation a synthetic multifilament thread in gel form is produced; a pair of spaced, cylindrical, wash rolls which are adapted to receive the gelled thread after its passage through said receptacle containing said liquid coagulant, which are suspended in the same vertical plane, which converge slightly toward each other at the take-off end thereby to advance the gelled thread in a helical path along said rolls, and which can be tilted at a substantial angle to the horizontal; means for applying a liquid treating agent to said advancing thread; means for driving said wash rolls at the same peripheral speed; means including a collector basin positioned beneath the lower of said pair of wash rolls for collecting the liquid treating agent after its application to said advancing thread; a stretch trough, adapted to contain a hot, aqueous medium, in operative relationship with the take-off end of said pair of wash rolls; means for moving the gelled thread through said stretch trough and for stretching it during its passage through said trough in contact with said hot, aqueous medium; means for applying a liquid composition containing an antistatic agent to the continuously moving, stretched, gelled thread; a pair of spaced, cylindrical, drying rolls which are suspended in the same vertical plane and which converge slightly toward each other at the take-off end thereby to advance the thread, while under tension, in a helical path along the rolls toward the take-off end while it is being dried; means for internally heating at least one of said drying rolls; means for driving said drying rolls at the same peripheral speed; a heat-treating furnace including a slot, having walls adapted to be electrically heated, in operative relationship with the take-off end of said drying rolls and separate therefrom; means for moving the dried thread through said slot; means including a pinch roll for relaxing the tension on said dried thread so that it is free to contract linearly during its passage through said slot; and means for continuously twisting the filaments of the thread and for collecting the twisted thread after its passage through said slot.

ARTHUR CRESSWELL.
IRVIN WIZON.

REFERENCES CITED

The following references are of record in the file of this patent:

UNITED STATES PATENTS

| Number | Name | Date |
|---|---|---|
| 2,249,797 | Torrence et al. | July 22, 1941 |
| 2,538,283 | Stanley | Jan. 16, 1951 |
| 2,542,098 | Stanley et al. | Feb. 20, 1951 |